United States Patent

Shiell et al.

[11] Patent Number: 6,138,232
[45] Date of Patent: Oct. 24, 2000

[54] MICROPROCESSOR WITH RATE OF INSTRUCTION OPERATION DEPENDENT UPON INTERRUPT SOURCE FOR POWER CONSUMPTION CONTROL

[75] Inventors: Jonathan H. Shiell, Plano; Robert D. Marshall, Jr., Garland, both of Tex.

[73] Assignee: Texas Instruments Incorporated, Dallas, Tex.

[21] Appl. No.: 08/994,834

[22] Filed: Dec. 19, 1997

Related U.S. Application Data

[60] Provisional application No. 60/034,445, Dec. 27, 1996.
[51] Int. Cl.[7] ............................... G06F 1/08; G06F 1/32; G06F 9/32
[52] U.S. Cl. .......................... 712/244; 713/323; 713/324; 713/501; 713/601
[58] Field of Search ............................. 712/244; 713/323, 713/324, 501, 601

[56] References Cited

U.S. PATENT DOCUMENTS

| | | | |
|---|---|---|---|
| 4,931,748 | 6/1990 | McDermott et al. | 331/1 A |
| 5,233,314 | 8/1993 | McDermott et al. | 331/17 |
| 5,493,684 | 2/1996 | Gephardt et al. | 713/321 |
| 5,719,510 | 2/1998 | Weidner | 327/119 |
| 5,815,693 | 9/1998 | McDermott et al. | 713/501 |
| 5,832,280 | 11/1998 | Swanberg | 713/300 |

*Primary Examiner*—William M. Treat
*Attorney, Agent, or Firm*—Robert D. Marshall, Jr.; W. James Brady, III; Frederick J. Telecky, Jr.

[57] ABSTRACT

A microprocessor operates at a rate dependent upon the interrupt source of a plurality of interrupt sources. The rate of power consumption by the microprocessor corresponds to the selected rate of instruction operation. A rate table accessed upon receipt of an interrupt stores a table of interrupt source to rate of instruction operation. The rate table may be a read only memory or a read/write memory loaded upon initiation of the microprocessor. The rate of microprocessor instruction operation may be set by frequency of an instruction clock or by a rate of instruction dispatch. For a superscalar microprocessor the rate of instruction operation may be set by setting a number of instructions dispatched per instruction cycle. On receiving an interrupt a rate number is pushed onto a rate stack. On return from the interrupt the rate stack is popped. The microprocessor operates at a rate corresponding to the rate number at a top of the rate stack. The invention may be coordinated with system management mode power control. A predetermined system management mode rate number is pushed onto the rate stack upon receipt of a system management interrupt entering the system management mode. The rate stack is popped upon exit from system management mode to normal mode.

34 Claims, 4 Drawing Sheets

MICROPROCESSOR WITH RATE OF INSTRUCTION OPERATION DEPENDENT UPON INTERRUPT SOURCE FOR POWER CONSUMPTION CONTROL

This application claims priority under 35 USC 119(e)(1) of provisional application Ser. No. 60/034,445, filed Dec. 27, 1996.

TECHNICAL FIELD OF THE INVENTION

The technical field of this invention is control of electrical power consumption in microprocessors.

BACKGROUND OF THE INVENTION

Control of power consumption in microprocessors is an important problem in the current technology. With the explosion of processing capacity in recent years, microprocessors are the key component of more and more end equipment. The increased usefulness of these devices has fueled consumer desire for further increased capacity. Many more devices including microprocessors are intended for portable applications where the device is powered by batteries. In these portable applications microprocessor power consumption is inversely proportional to the life between battery changes or recharges.

In general, the recent increase in computational capacity was achieved by operating the microprocessors at higher frequency rates or by operating more circuits in parallel. Both techniques tend to increase power consumption. Improvements in semiconductor manufacturing technology have reduced the size of individual semiconductor elements thereby permitting reductions in the electrical current consumed and the supply voltage required. These semiconductor manufacturing improvements have permitted the recent increase in processing capacity to take place at similar or lower power consumption levels. However, the rate of increasing demand for greater computational capacity in portable devices threatens to overtake the rate of manufacturing improvements. Thus any circuit or architectural techniques for reducing power consumption by microprocessors would be valuable.

SUMMARY OF THE INVENTION

This invention is method of operating a microprocessor. The microprocessor accepts an interrupt from one of a plurality of interrupt sources. The microprocessor then operates at a rate dependent upon the interrupt source. The rate of power consumption by the microprocessor corresponds to the selected rate of instruction operation.

A rate table stores a table of interrupt source to rate of instruction operation. The rate table is accessed upon receipt of an interrupt to obtain a rate of instruction operation corresponding to the interrupt source. The microprocessors is then operated at the recalled rate. The rate table may be a read only memory or a read/write memory loaded upon initiation of the microprocessor.

There are several techniques for setting the rate of microprocessor instruction operation. The frequency of an instruction clock of the microprocessor may be set via a divide number in a programmable divider in a phase locked loop circuit. The divide number may be stored in a divide number table. This may include a two stage set of tables including a rate table of interrupt source to rate number and a divide table of rate number to divide ratio. Alternatively, the rate of instruction operation may be controlled by a rate of instruction dispatch. For a superscalar microprocessor capable of concurrently executing plural instructions simultaneously the rate of instruction operation may be set by setting a number of instructions dispatched per instruction cycle. This could include dispatching instructions to a number of execution units based upon the selected rate. Electric power consumption is conserved by powering only those execution units to which instructions are dispatched.

The invention preferably includes a rate stack. On receiving an interrupt a rate number is pushed onto the rate stack. On return from the interrupt the rate stack is popped. The microprocessor operates at a rate corresponding to the rate number at a top of the rate stack. A bottom entry of the rate stack stores the greater of the prior bottom entry or a next to bottom entry upon a push. On a pop the prior bottom entry is copied to the next to bottom entry. Alternatively, the bottom entry of the rate stack returns a rate number corresponding to a maximum rate of instruction operation upon a pop of the rate stack when empty.

The invention may be coordinated with system management mode power control. A predetermined system management mode rate number is pushed onto the rate stack upon receipt of a system management interrupt entering the system management mode. The rate stack is popped upon exit from system management mode to normal mode.

BRIEF DESCRIPTION OF THE DRAWINGS

These and other aspects of this invention are illustrated in the drawings, in which.

DETAILED DESCRIPTION OF PREFERRED EMBODIMENTS

This invention enables a microprocessor to operate at differing instruction rates in response to an interrupt depending on the source of the interrupt. It is known in the art that the rate of microprocessor operation is directly related to its power consumption. Thus any time that the microprocessor runs at less than its maximum instruction rate power consumption is reduced. Many sources of interrupts do not require the maximum computation capacity of the microprocessor. For example, operation in response to a keyboard or mouse interrupt may often take place at much less than the maximum instruction rate without causing a perceivable loss of speed. Other interrupt sources such as the fixed disk drive may need the maximum capacity of the microprocessor for service without perceivable loss of speed. This invention enables the rate of microprocessor instruction operation to match the rate needed to service the source of an interrupt. Thus power consumption is reduced when operating in response to interrupt sources that do not require the maximum computation capacity of the microprocessor.

Figure 1:
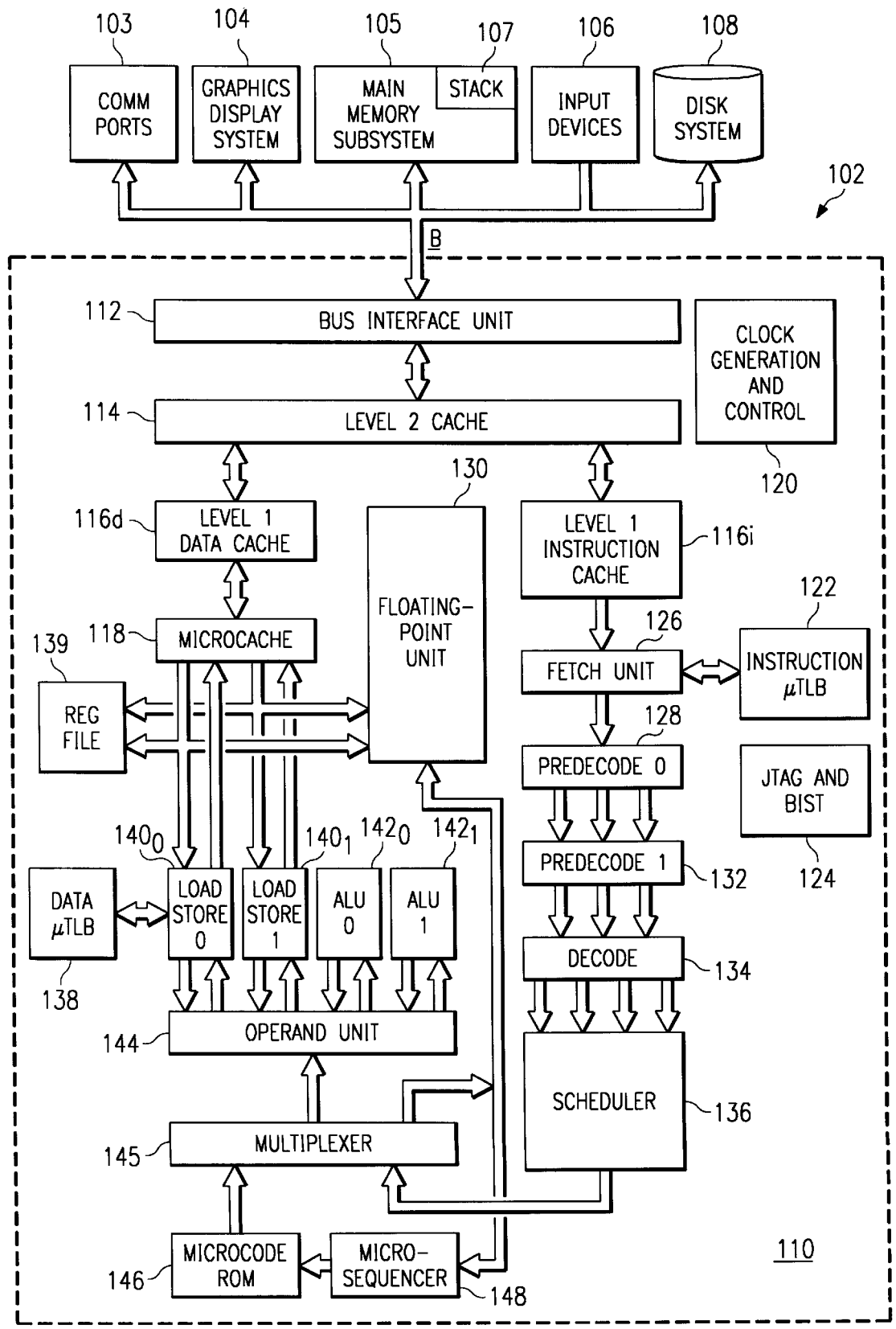
FIG. 1 illustrates in block diagram form the general architecture of a microprocessor to which this applicable.

FIG. 1 illustrates a block diagram of a microprocessor into which the embodiments of this invention may be incorporated. Referring now to FIG. 1, an exemplary data processing system 102, including an exemplary superscalar pipelined microprocessor 110 within which the preferred embodiment is implemented, will be described. It is to be understood that the architecture of system 102 and of microprocessor 110 is described herein by way of example only, as it is contemplated that the present embodiments may be utilized in microprocessors of various architectures. It is therefore contemplated that one of ordinary skill in the art, having reference to this specification, will be readily able to implement the present embodiments in such other microprocessor architectures.

Microprocessor 110, as shown in FIG. 1, is connected to other system devices by way of bus B. While bus B, in this example, is shown as a single bus, it is of course contemplated that bus B may represent multiple buses having different speeds and protocols, as is known in conventional computers utilizing the PCI local bus architecture; single bus B is illustrated here merely by way of example and for its simplicity. System 102 contains such conventional subsystems as communication ports 103 (including modem ports and modems, network interfaces, and the like), graphics display system 104 (including video memory, video processors, a graphics monitor), main memory system 105 that is typically implemented by way of dynamic random access memory (DRAM) and includes a stack 107, input devices 106 (including keyboard, a pointing device, and the interface circuitry therefor), and disk system 108 (which may include hard disk drives, floppy disk drives, and CD ROM drives). It is therefore contemplated that system 102 of FIG. 1 corresponds to a conventional desktop computer or workstation, as are now common in the art. Of course, other system implementations of microprocessor 110 can also benefit from the present embodiments, as will be recognized by those of ordinary skill in the art.

Microprocessor 110 includes a bus interface unit (BIU) 112 that is connected to bus B, and controls and effects communication between microprocessor 110 and the other elements in system 102. BIU 112 includes the appropriate control and clock circuitry to perform this function, including write buffers for increasing the speed of operation, and including timing circuitry so as to synchronize the results of internal microprocessor operation with bus B timing constraints. Microprocessor 110 also includes clock generation and control circuitry 120 which, in this exemplary microprocessor 110, generates internal clock phases based upon the bus clock from bus B; the frequency of the internal clock phases, in this example, may be selectably programmed as a multiple of the frequency of the bus clock.

As is evident in FIG. 1, microprocessor 110 has three levels of internal cache memory, with the highest of these as level 2 cache 114, which is connected to BIU 112. In this example, level 2 cache 114 is a unified cache, and is configured to receive all cacheable data and cacheable instructions from bus B via BIU 112, such that much of the bus traffic presented by microprocessor 110 is accomplished via level 2 cache 114, Of course, microprocessor 110 may also effect bus traffic around cache 114, by treating certain bus reads and writes as "not cacheable." Level 2 cache 114, as shown in FIG. 1, is connected to two level 1 caches 116; level 1 data cache $116_d$ is dedicated to data, while level 1 instruction cache $116_i$ is dedicated to instructions. Power consumption by microprocessor 110 is minimized by only powering level 2 cache 114 to service cache misses within the appropriate one of the level 1 caches 116. Furthermore, on the data side, microcache 118 is provided as a level 0 cache, which in this example is a fully dual ported cache.

As shown in FIG. 1 and as noted hereinabove, microprocessor 110 is of the superscalar type. In this example multiple execution units are provided within microprocessor 110, allowing up to four instructions to be simultaneously executed in parallel for a single instruction pointer entry. These execution units include two ALUs $142_0$, $142_2$ for processing conditional branch, integer, and logical operations, floating point unit (FPU) 130, two load-store units $140_0$, $140_1$, and microsequencer 148. The two load-store units 140 utilize the two ports to microcache 118, for true parallel access thereto, and also perform load and store operations to registers in register file 139. Data microtranslation lookaside buffer (μTLB) 138 is provided to translate logical data addresses into physical addresses, in the conventional manner.

These multiple execution units are controlled by way of multiple pipelines with seven stages each, with write back. The pipeline stages are as follows:

F Fetch: This stage generates the instruction address and reads the instruction from the instruction cache or memory PD0 Predecode stage 0: This stage determines the length and starting position of up to three fetched x86 type instructions PD1 Predecode stage 1: This stage extracts the x86instruction bytes and recodes them into fixed length format for decode DC Decode: This stage translates the x86 instructions into atomic operations (AOps)

SC Schedule: This stage assigns up to four AOps to the appropriate execution units OP Operand: This stage retrieves the register operands indicated by the AOps EX Execute: This stage runs the execution units according to the AOps and the retrieved operands WB Write back: This stage stores the results of the execution in registers or in memory Referring back to FIG. 1, the pipeline stages noted above are performed by various functional blocks within microprocessor 110. Fetch unit 126 generates instruction addresses from the instruction pointer, by way of instruction micro-translation lookaside buffer (μTLB) 122, which translates the logical instruction address to a physical address in the conventional way, for application to level 1 instruction cache $116_i$. Instruction cache $116_i$ produces a stream of instruction data to fetch unit 126, which in turn provides the instruction code to the predecode stages in the desired sequence. Speculative execution is primarily controlled by fetch unit 126, in a manner to be described in further detail hereinbelow.

Predecoding of the instructions is broken into two parts in microprocessor 110, namely predecode 0 stage 128 and predecode 1 stage 132. These two stages operate as separate pipeline stages, and together operate to locate up to three x86 instructions and apply the same to decoder 134. As such, the predecode stage of the pipeline in microprocessor 110 is three instructions wide. Predecode 0 unit 128, as noted above, determines the size and position of as many as three x86 instructions (which, of course, are variable in length), and as such consists of three instruction recognizers; predecode 1 unit 132 recodes the multi-byte instructions into a fixed length format, to facilitate decoding.

Decode unit 134, in this example, contains four instruction decoders, each capable of receiving a fixed length x86 instruction from predecode 1 unit 132 and producing from one to three atomic operations (AOps); AOps are substantially equivalent to RISC instructions. Three of the four decoders operate in parallel, placing up to nine AOps into the decode queue at the output of decode unit 134 to await scheduling; the fourth decoder is reserved for special cases. Scheduler 136 reads up to four AOps from the decode queue at the output of decode unit 134, and assigns these AOps to the appropriate execution units, floating-point unit 130, control ALUs 142 and load/store units 140. Scheduler 136 dispatches up to four AOps to the assigned execution units when an appropriate execution unit is free. For example, floating point instructions can only be dispatched to floating-point unit 103. In addition, the operand unit 144 receives and prepares the operands for execution, As indicated in FIG. 1, operand unit 144 receives an input from scheduler 136 and also from microcode ROM 148, via multiplexer 145, and fetches register operands for use in the execution of the instructions. In addition, according to this example, operand unit 144 performs operand forwarding to send results to registers that are ready to be stored, and also performs address generation for AOps of the load and store type.

Microsequencer 148, in combination with microcode ROM 146, control ALUs 142 and load/store units 140 controls the execution of microcode entry AOps, which are generally the last AOps to execute in a cycle. In this example, microsequencer 148 sequences through microinstructions stored in microcode ROM 146 to effect this control for those microcoded microinstructions. Examples of microcoded microinstructions include, for microprocessor 110, complex or rarely used x86 instructions, x86 instructions that modify segment or control registers, handling of exceptions and interrupts, and multi-cycle instructions (such as REP instructions, and instructions that PUSH and POP all registers).

Microprocessor 110 also includes circuitry 124 for controlling the operation of JTAG scan testing, and of certain built-in self-test functions, ensuring the validity of the operation of microprocessor 110 upon completion of manufacturing, and upon resets and other events.

Figure 2:
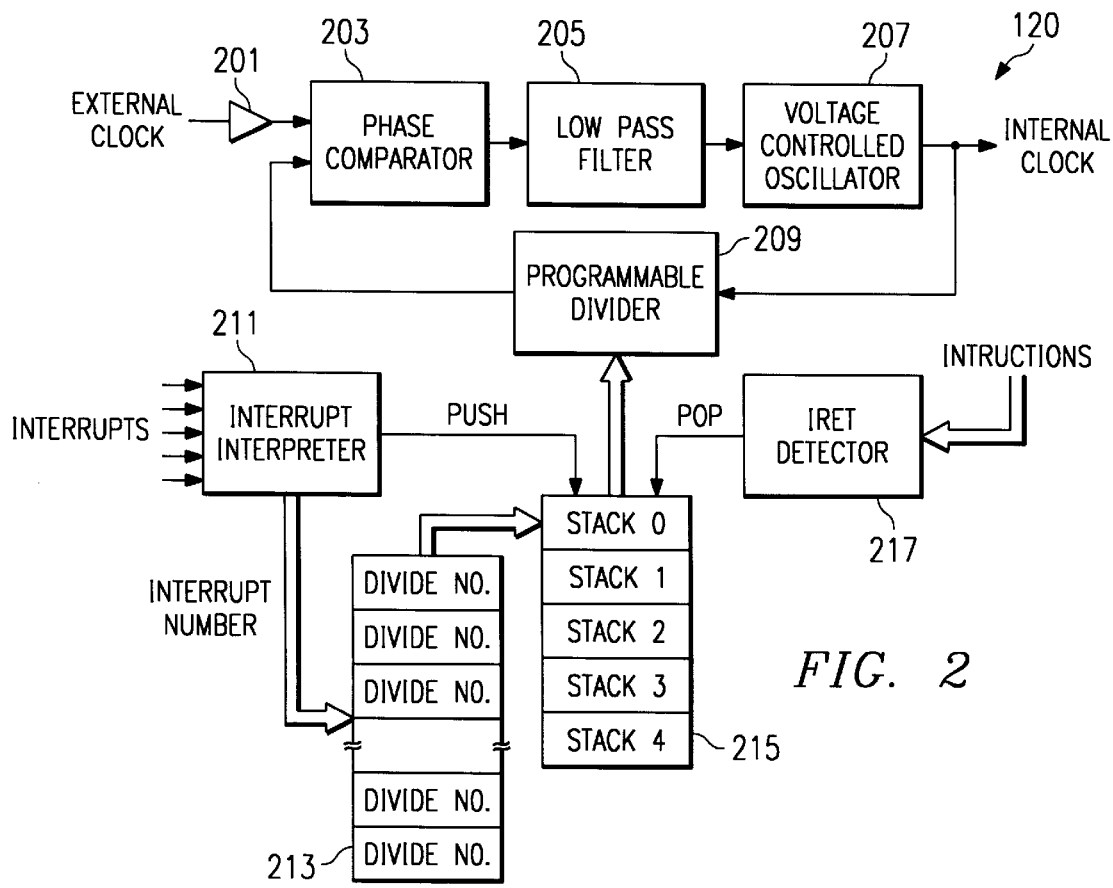
FIG. 2 illustrates in block diagram form a first embodiment of a portion of clock generation and control circuit, illustrated in FIG. 1, controlling the rate of instruction operation by controlling the microprocessor clock rate.

FIG. 2 illustrates circuits included within clock generation and control 120 for practicing this invention. FIG. 2 illustrates a conventional phase locked loop circuit including buffer 201, phase comparator 203, low pass filter 205, voltage controlled oscillator 207 and programmable divider 209. Buffer 201 receives an external clock signal and isolates the rest of the phase locked loop from this external signal. The external clock signal serves as the standard for setting the frequency of operation of microprocessor 110. It is typical for the external bus B to operate at the frequency of this external clock signal. In microprocessors of the x86 type the external clock signal has a frequency from 25 MHz to 66 MHz.

The output signal from buffer 201 supplies one input to phase comparator 203. The other input to phase comparator 203 comes from programmable divider 209. Phase comparator 203 produces a signal corresponding to the phase difference between its two inputs. This output signal is supplied to low pass filter 205 for smoothing. Voltage controlled oscillator 207 produces an oscillating signal having a frequency corresponding to the smoothed phase difference signal from low pass filter 205. This output is the internal clock signal used to control operations of microprocessor 110. The phase locked loop ensures that the internal clock tracks the frequency and phase of the external clock.

The division performed by programmable divider 209 determines the frequency ratio between the external clock signal and the internal clock signal. Thus the frequency of operation of microprocessor 110 may be controlled by control of this division. Thus microprocessor 110 may operate at a frequency different from the frequency of the external clock and the external bus B. In microprocessors of the x86 type the frequency ratio is typically from 1:1 up to 3:1. Thus microprocessor 110 may operate at an internal clock frequency from 25 MHz to 200 MHz.

FIG. 2 illustrates how this division amount is controlled by the interrupt source. Interrupt interpreter 211 receives all the interrupts as inputs. Interrupt interpreter 211 generates an interrupt number corresponding to the source of the interrupt. This process is known in the art. The interrupt number conventionally is used as an index into a table of addresses of the starting address of interrupt handling routines. It is conventional to use the interrupt number to control a program branch to the interrupt handling routine written for that interrupt. In microprocessors of the x86 type there are 256 interrupt sources and the interrupt number (also known as an interrupt vector) is coded in 8 bits.

This invention further uses that interrupt number as an index into a table 213. Table 213 stores at each location the divide number used by programmable divisor for the interrupt source corresponding to that interrupt number. This divide number is supplied to that top of divide number stack 215. Interrupt interpreter 211 also generates a Push signal supplied to divide number stack 215. Divide number stack 215 pushes the divide number recalled from table 213 onto its stack in response to this Push signal. Note that divide number stack 215 also supplies the divide number at the top of its stack to programmable divider 209. Thus the frequency ratio between the external clock and the internal clock corresponds to the divide number on the top of divide number stack 215.

The IRET detector 217 supplies a Pop signal to divide number stack 215. The IRET detector 217 receives an indication of instructions fetched by fetch unit 126 and scheduled by scheduler 136. The IRET instruction is a special instruction that causes a return from an interrupt handling routine. The IRET detector 217 detects the execution of an IRET instruction and sends a Pop signal to divide number stack 215. This flushes the last entered divide number and returns to the immediately prior loaded divide number. Thus the program state before the last interrupt is restored.

In the preferred embodiment, stack 215 includes logic to coordinate operation with the two inputs, interrupt interpreter 211 and IRET detector 217. This logic provides priority to one of the Push or Pop signal when they are received simultaneously. It is believed preferable to implement the Pop from IRET detector 217 before implementing the Push from interrupt interpreter 212. Alternatively, interrupt interpreter 211 and IRET detector 217 could be coupled in some manner to coordinate their operation to avoid simultaneous generation of the Push and Pop signals. Such stack control is conventional and will not be further described.

The invention operates as follows. Upon receipt of an interrupt, interrupt interpreter 211 determines its corresponding interrupt number. This interrupt number is used as an index into divide number table 213, which outputs the divide number corresponding to the interrupt number. This divide number is pushed onto the top of divide number stack 215 and as the top of stack entry is supplied to programmable divider 209. Thus the frequency of the internal clock depends upon the interrupt source. Upon return from this interrupt handling routine via the IRET instruction, the stack pops and the prior entry controls the divide operation of programmable divider 209.

In the preferred embodiment of this invention the mapping of interrupt number to interrupt source is fixed. Microprocessors of the x86 type permit 256 interrupt sources that are mapped into an 8 bit interrupt vector or interrupt number. Much of this mapping from interrupt source to interrupt vector is standard. Thus the required rate of instruction operation for each interrupt source is also generally known. Thus it is desirable that table 213 be fixed in manufacture. In the preferred embodiment table 213 consists of read only memory. Table 213 would include divide numbers corresponding to low instruction operation rates for the keyboard and mouse interrupts, divide numbers corresponding to low intermediate instruction operation rates for BIOS services and some operating system functions such as disk directory and copy functions, divide numbers corresponding to high intermediate instruction operation rates for some operating system functions such as task and memory management, I/O port management and floppy disk drive data transfers and divide numbers corresponding to high instruction operation rates for fixed disk drive data transfers.

The depth of divide number stack 215 is selected to be adequate for most situations. FIG. 2 illustrates a stack. depth of 5, but any stack depth between 4 and 8 may be suitable. If there are more pending interrupt levels than the number of entries in divide number stack 215, then the first entered divide numbers will be lost. Upon return to the top level interrupt, divide number stack 215 will be empty. To avoid anomalous operation in these cases the bottom entry of stack 215 operates differently than ordinary stacks. In response to a Push signal the bottom entry of stack 215, illustrated as stack entry 4 in FIG. 2, stores either the divide number previously in stack entry 4 or the pushed divide number of stack entry 3. The divide number selected is the divide number corresponding to the greater rate of instruction operation. On a Pop, this divide number is retained within the bottom of the stack as well as copied to the next to the last stack entry. Thus upon a stack overflow, the bottom entry in the stack stores the divide number corresponding to the greatest rate of instruction operation reaching the bottom of the stack. When this divide number reaches the top of the stack in response to Pop signals, it controls a rate of instruction operation at least as great as maximum required by the corresponding interrupt source. In some cases this rate will be greater than needed, but it will never be less. In instances where the stack overflow occurs for divide numbers corresponding to less than the maximum rate of instruction operation, managing the stack this way still provides some power savings in most cases.

Alternatively, divide number stack 215 may be constructed to fill emptied entries from the bottom of the stack with a divide number corresponding to the maximum rate of instruction operation. This maximum rate of instruction operation will not provide any power consumption savings. However, this assures that the interrupt or other process will have the maximum available computational capacity of microprocessor 110. Thus there will be no detrimental slowing of operation.

The interrupt sources permitted in microprocessors of the x86 type are of several types. Some interrupt sources relate to various input/output devices such as the keyboard, mouse, serial port or ports and parallel port. Other interrupt sources relate to storage devices such as a floppy disk drive or a fixed disk drive. The basic input/output system (BIOS) includes a number of services accessed by interrupts. Lastly, the operating system includes further services such as error handlers, calls to operating system functions, memory managers, etc. In many computers the speed of operation of these various functions is not fixed. For example, the speed of operation of the fixed disk drive may vary depending on the installed unit. The speed needed to service a serial port may vary greatly dependent upon the connected external device. Accordingly, sometimes it may be desirable to permit the computer to vary the divide number corresponding to a particular interrupt number. In such cases, table 213 may be provided as read/write memory that may be altered during operation of microprocessor 110. In the preferred embodiment, table 213 is loaded from data of a device driver stored in a nonvolatile memory upon each initialization of computer system 102. The nonvolatile memory is preferably a fixed disk drive installed in the computer. This process permits providing data in the device driver corresponding to equipment originally provided in computer system 102. If the configuration of computer system 102 is changed after initial manufacture, then the data within the device driver may be altered as needed to accommodate the new configuration. For example, installation of a faster modem may require that microprocessor 110 operate at a higher rate than the originally installed modem. A change in the data loaded into table 213 permits the rate of instruction operation upon interrupts to the connected serial port to be increased to accommodate the faster modem.

Figure 3:
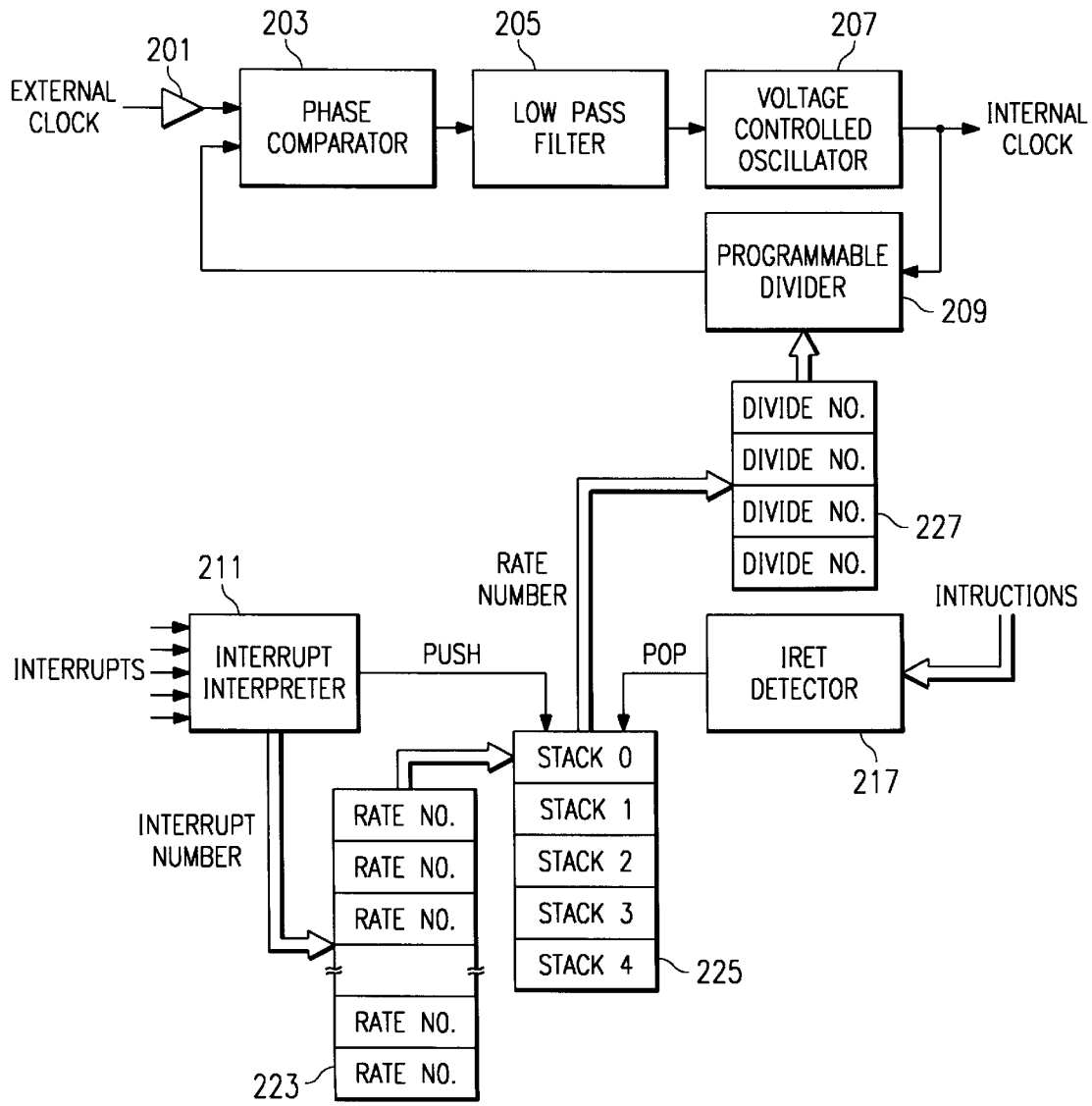
FIG. 3 illustrates in block diagram form an alternative embodiment of a portion of clock generation and control circuit, illustrates in FIG. 1, controlling the rate of instruction operation by controlling the microprocessor clock rate.

FIG. 3 illustrates an alternative embodiment for control of the internal clock frequency. In FIG. 3 the interrupt number from interrupt interpreter 211 serves as an index for access to table 223. Rather than storing the actual divide number, table 223 stores a coded rate number. It is contemplated that this invention will need no more than 4 or 8 differing instruction operation rates. Thus the available instruction operation rates can be indicated with 2 or 3 bits. Depending on the way programmable divider 209 operates, the divide number may require more than this number of bits. If this is the case, it is better for table 223 to use only coded rate numbers. These coded rate numbers are stored on rate number stack 225. These coded rate numbers are pushed and popped onto rate number stack 225 in a manner similar to that described above regarding divide number stack 215. The output of rate number stack 225 serves as an index into table 227. Rate number stack 225 may include either of the above described alternatives for handling stack overflow. Table 227 stores the divide numbers corresponding to the rate number indexes. The divide number selected by the rate number output of rate number stack 225 is supplied to programmable divider 209 for control of the divide amount. As previously disclosed with relation to table 213, table 223 could be a read only memory or a read write memory preferably loaded at initialization of computer system 102. Table 227 is preferably a read only memory. Because the size of table 227 is smaller than table 223, this technique generally saves area within the integrated circuit embodying microprocessor 110 when the number of bits of the divide number exceeds the number of bits of the rate number.

Figure 4:
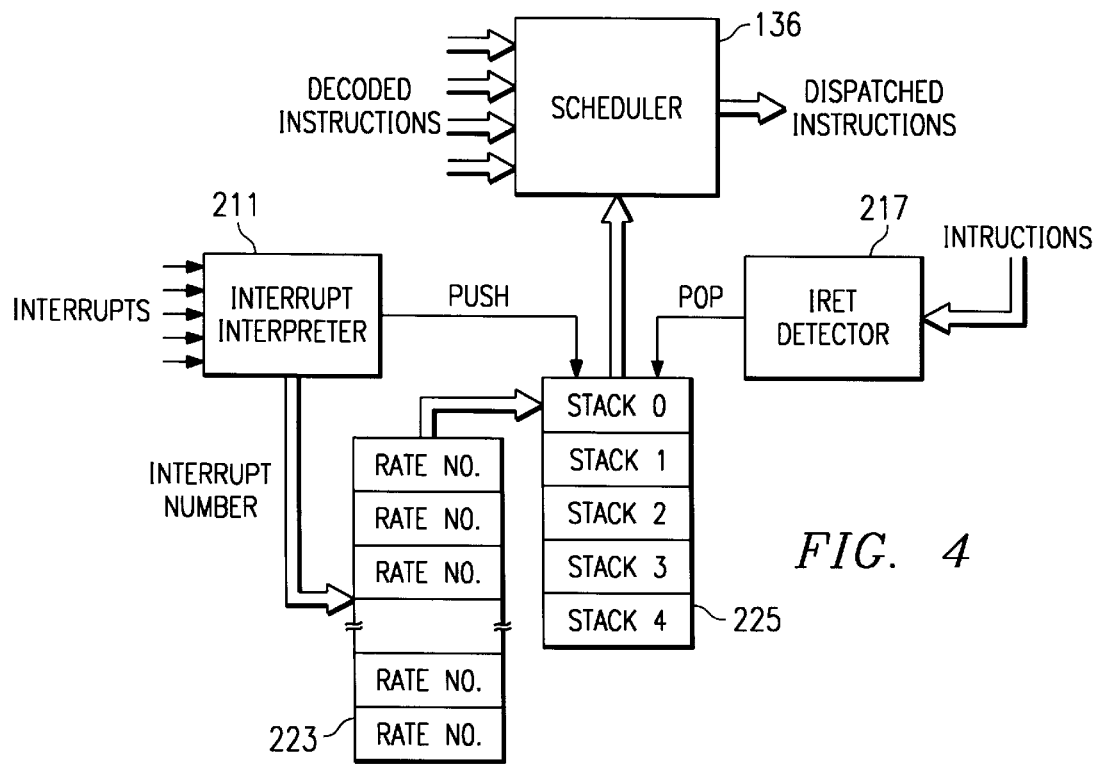
FIG. 4 illustrates in block diagram form an alternative embodiment of this invention controlling the rate of instruction operation by controlling the scheduler illustrated in FIG. 1.

FIG. 4 illustrates another alternative embodiment of this invention. FIG. 4 includes interrupt interpreter 211, table 223, rate number stack 225 and IRET detector 217 as previously described in conjunction with FIG. 2. The rate number output from the top of rate number stack 225 is supplied to scheduler 136. Scheduler 136 schedules and dispatches instructions differently according to the received rate number. An example of these different schedule and dispatch protocols is listed in Table 1.

TABLE 1

| Rate Number | | | Schedule and Dispatch Protocol |
|---|---|---|---|
| 0 | 0 | 0 | single issue and 3 waits |
| 0 | 0 | 1 | single issue alternating with wait |
| 0 | 1 | 0 | single issue |
| 0 | 1 | 1 | dual issue |
| 1 | 0 | 0 | quad issue |
| 1 | 0 | 1 | quad issue, partial speculative execution |
| 1 | 1 | 0 | quad issue, full speculative execution |
| 1 | 1 | 1 | quad issue, full speculative execution, out of order execution |

These protocols will be explained. In the first protocol responsive to a 3 bit rate number of 000, scheduler 136 issues a single instruction for each four instruction cycles. In the second protocol responsive to rate number 001, scheduler 136 issues single instructions every other instruction cycle. In the third protocol responsive to rate number 010, scheduler 136 issues a single instruction each instruction cycle. In the fourth protocol responsive to rate number 011, scheduler 136 may issue up to two instructions each instruction cycle. In the fifth protocol responsive to rate number 100, scheduler 136 may issue up to four instructions each instruction cycle. In the sixth protocol responsive to rate number 101, scheduler 136 may issue up to four instructions each instruction cycle and may issue some instructions past predicted branches (partial speculative execution). In the seventh protocol responsive to rate number 110, scheduler 136 may issue up to four instructions each instruction cycle and may issue instructions past predicted branches (full speculative execution). In the eighth protocol responsive to rate number 111, scheduler 136 may issue up to four instructions each instruction cycle, may issue instructions past predicted branches (full speculative execution) and may issue instructions out of program order (out of order execution).

These protocols are arranged in order of increasing instruction operation rate and increasing power consumption. Most microprocessors of the type to which this invention is applicable are constructed of complementary metal oxide semiconductor (CMOS) circuits. It is known in the art that CMOS circuits consume very little power when not switching. Thus reducing the rate of instruction dispatch, which consequently reduces the number of execution units concurrently operating, reduces the power consumption. Reducing the amount of speculative execution reduces the average number of instructions that can be dispatched per instruction cycle, thus also contributing to reduction of power consumption. Similarly, executing instructions in program order only reduces the average number of instructions that can be issued per instruction cycle relative to permitting out of order execution. This reduction similarly reduces power consumption. This technique reduces power consumption by reducing the extent of use of the computational resources of microprocessor 110. This technique would yield additional reduction in power consumption when coupled with turning off portions of microprocessor 110 not used by currently dispatched instruction(s).

Figure 5:
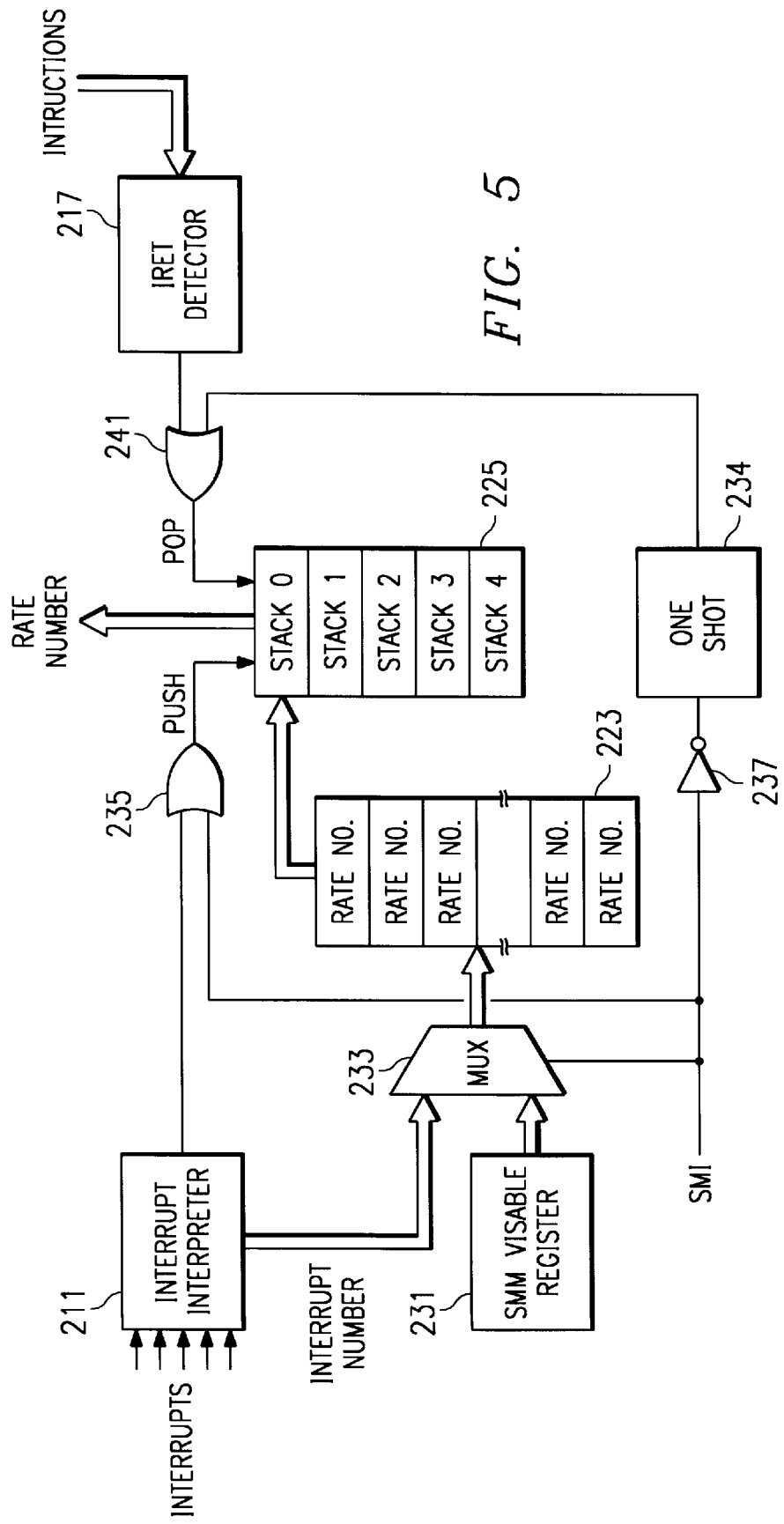
FIG. 5 illustrates in block diagram form an embodiment of this application combining power consumption control based upon interrupt source and power consumption control from a system management mode.

FIG. 5 illustrates an embodiment of this invention in which the instruction operation rate control corresponding to the interrupt source is combined with instruction operation rate control in a system management mode. Computer systems employing microprocessors in the x86 family enable a system management mode (SMM) of operation. The SMM can be used by system firmware to control product specific hardware features in a manner that is transparent to the computer operating system and applications programs. The SMM management mode is typically used for system management information such as the system configuration, or the configuration of a powered down microprocessor or to invoke power saving features such as a zero volt suspend function. The power savings feature may be achieved by reducing the external clock frequency. This causes a similar decrease in the internal clock frequency and a consequent power consumption reduction.

Unique to the system management mode is dedicated system interrupt line SMI and a dedicated memory space SMRAM. The SMM is typically used to implement intelligent power management and other enhanced system functions from SMRAM transparently to the operating system and applications programs. Assertion of a system management interrupt (SMI) invokes the system management mode. Microprocessor 110 responds by asserting a system management interrupt acknowledge SMIACT signal. Microprocessor 110 then operates from the dedicated memory space SMRAM.

FIG. 5 includes interrupt interpreter 211, rate number table 223, rate number stack 225 and IRET detector 217 as illustrated in FIG. 3. These circuits operate as previously described when microprocessor 110 is not in system management mode. When in system management mode the system management interrupt (SMI) signal is active. This causes multiplexer 233 to select the output from SMM visible register 231 rather than the interrupt number output of interrupt interpreter 211. This new selection is supplied to table 223, causing recall of the corresponding rate number. This is supplied to rate number stack 225 to push the contents of SMM visible register 232 onto the top of the stack. Note that SMI provides the Push signal via OR gate 235. This top of stack rate number is output via rate number stack 225. This rate number may be supplied to table 227 as illustrated in FIG. 3 for control of the internal clock frequency. Alternatively, this rate number may be supplied to scheduler 136 as illustrated in FIG. 4 for control of the schedule and dispatch protocol. In either case the data within SMM visible register 231 controls the rate of instruction operation of microprocessor 110. Exit from system management mode is detected by deactivation of the SMI signal. Invertor 237 and one shot 239 cause a Pop signal to be supplied to rate number table 225 via OR gate 241. This returns rate number stack 225 to the prior rate number recovering the previous instruction operation rate.

Many other variations and modifications may be made in the techniques and apparatus hereinabove described, by those having expertise in this technology, without departing from the concepts of the present invention. Accordingly, it should be clearly understood that the methods and apparatus depicted in the accompanying drawings and referred to in the foregoing description are illustrative only and are not intended as limitations on the scope of the invention.

What is claimed is:

1. A method of operating a microprocessor comprising the steps of:

accepting an interrupt from one of a plurality of interrupt sources to change from operating on a current task to operating on a priority task; and setting a rate of microprocessor instruction operation during operation in response to an interrupt dependent upon the interrupt source producing the interrupt.

2. The method of operating a microprocessor of claim 1, wherein:

the microprocessor rate of power consumption corresponds to the selected rate of instruction operation.

3. The method of operating a microprocessor of claim 1, wherein:

said step of setting a rate of microprocessor instruction operation includes storing a rate table of interrupt source to rate of instruction operation, upon receipt of an interrupt accessing the table to obtain a rate of instruction operation corresponding to the interrupt source producing the interrupt, and operate the microprocessor at a rate corresponding to the rate of instruction operation obtained from the rate table.

4. The method of operating a microprocessor of claim 3, wherein:

said step of storing a rate table of interrupt source to rate of instruction operation includes permanently storing the rate table in a read only memory.

5. The method of operating a microprocessor of claim 3, wherein:

said step of storing a rate table of interrupt source to rate of instruction operation includes temporarily storing the rate table in read/write memory.

6. The method of operating a microprocessor of claim 5, wherein:

said step of storing a rate table of interrupt source to rate of instruction operation includes loading the rate table upon initiation of microprocessor.

7. The method of operating a microprocessor of claim 1, wherein:

said step of setting a rate of microprocessor instruction operation includes setting a frequency of an instruction clock of the microprocessor.

8. The method of operating a microprocessor of claim 7, wherein:

said step of setting a frequency of an instruction clock of the microprocessor includes setting a divide number in a programmable divider in a phase locked loop circuit generating the instruction clock.

9. The method of operating a microprocessor of claim 7, wherein:

said step of setting a frequency of an instruction clock of the microprocessor includes storing a divide number table of interrupt source to divide number, upon receipt of an interrupt accessing the divide number table to obtain a divide number corresponding to the interrupt source producing the interrupt, and setting a divide number in a programmable divider in a phase locked loop circuit generating the instruction clock corresponding to the divide number obtained from the divide number table.

10. The method of operating a microprocessor of claim 7, wherein:

said step of setting a frequency of an instruction clock of the microprocessor includes storing a rate table of interrupt source to rate of instruction operation, upon receipt of an interrupt accessing the table to obtain a rate of instruction operation corresponding to the interrupt source producing the interrupt, storing a divide number table of rate of instruction operation to divide number, accessing the divide number table to obtain a divide number corresponding to the obtained rate of instruction operation, and setting a divide number in a programmable divider in a phase locked loop circuit generating the instruction clock corresponding to the divide number obtained from the divide number table.

11. The method of operating a microprocessor of claim 1, wherein:

said step of setting a rate of microprocessor instruction operation includes setting a rate of instruction dispatch.

12. The method of operating a microprocessor of claim 1, wherein:

the microprocessor is a superscalar microprocessor capable of concurrently executing plural instructions simultaneously; and said step of setting a rate of microprocessor instruction operation includes setting a number of instructions dispatched per instruction cycle.

13. The method of operating a microprocessor of claim 12, wherein:

the microprocessor includes a plurality of independent execution units each independently capable of executing an instruction; and said step number of setting a number of instructions dispatched includes dispatching instructions to a number of said plurality of execution units based upon the selected rate.

14. The method of operating a microprocessor of claim 13, wherein:

said step of dispatching instructions to a number of said plurality of execution units includes dispatching instructions to each of said plurality of execution units for a first highest selected rate, dispatching instructions to a number of execution units less than all of said plurality of execution units for a second selected rate lower than said first selected rate, dispatching an instruction to only one execution unit for a third selected rate lower than said second selected rate, and dispatching an instruction to only one execution unit an instruction cycle followed by dispatching no instruction for at least one instruction cycle for a fourth selected rate lower than said third selected rate.

15. The method of operating a microprocessor of claim 14, further comprising:

supplying electric power only to those execution units to which instructions are dispatched.

16. The method of operating a microprocessor of claim 13, wherein:

said step number of dispatching instructions to a number of said plurality of execution units based upon the selected rate includes dispatching instructions in accordance with speculative execution past a branch instruction for a first highest selected rate, and dispatching no instructions in accordance with speculative execution past a branch instruction for at least on second selected rate lower than the first selected rate.

17. The method of operating a microprocessor of claim 13, wherein:

said step number of dispatching instructions to a number of said plurality of execution units based upon the selected rate includes dispatching instructions out of program order for a first highest selected rate, and dispatching instructions only in program order for at least on second selected rate lower than the first selected rate.

18. The method of operating a microprocessor of claim 1, wherein:
said step of setting a rate of microprocessor instruction operation includes
pushing a rate number onto a rate stack upon receiving an interrupt,
popping a rate number off the rate stack upon return from an interrupt, and
operating the microprocessor at a rate corresponding to the rate number at a top of the rate stack.

19. The method of operating a microprocessor of claim 18, wherein:
a bottom entry of the rate stack stores the greater of the prior bottom entry or a next to bottom entry upon a push of the rate stack and copies the prior bottom entry to the next to bottom entry upon a pop of the rate stack.

20. The method of operating a microprocessor of claim 18, wherein:
a bottom entry of the rate stack returns a rate number corresponding to a maximum rate of instruction operation upon a pop of the rate stack when a bottom entry of the rate stack in empty.

21. The method of operating a microprocessor of claim 18, further comprising:
pushing a predetermined system management mode rate number onto the rate stack upon receipt of a system management interrupt entering a system management mode; and
popping the rate stack upon exit from system management mode to a normal mode.

22. The method of operating a microprocessor of claim 21, wherein:
the predetermined system management mode rate is stored in rate register.

23. A microprocessor comprising:
an interrupt interpreter connected to a plurality of interrupt sources and having an output generating an interrupt number corresponding to one of said plurality of interrupt sources generating an interrupt;
a rate table memory storing a plurality of rate of instruction operation indicators at locations corresponding to interrupt numbers, said rate table memory having an address input receiving said interrupt number from said interrupt interpreter and an output supplying said rate of instruction operation indicator corresponding to a received interrupt number; and
instruction rate control means connected to receive said rate of instruction operation indicator output from said rate table memory for operating the microprocessor at a rate of instruction operation corresponding to a received rate of instruction operation indicator.

24. The microprocessor of claim 23, wherein:
said rate table memory consists of a read only memory.

25. The microprocessor of claim 23, wherein:
said rate table memory consists of a read/write memory.

26. The microprocessor of claim 25, further comprising:
means for loading said rate table upon initiation of microprocessor.

27. The microprocessor of claim 23, further comprising:
an external clock input for receiving an external clock signal;
a phase locked loop circuit having an input connected to said external clock input, a programmable divider connected to said rate table memory and an output generating an internal clock signal in phase synchronization with said external clock signal, said programmable divider setting a relationship between an external clock frequency and an internal clock frequency dependent upon said rate of instruction operation indicator.

28. The microprocessor of claim 23, further comprising:
an external clock input for receiving an external clock signal;
a divide number memory storing a plurality of divide numbers at locations corresponding to said rate of instruction operation indicators, said divide number memory having an address input receiving said rate of instruction operation indicator from said rate table memory and an output supplying said divide number corresponding to a received rate of instruction operation indicator; and
a phase locked loop circuit having an input connected to said external clock input, a programmable divider connected to said divide number memory and an output generating an internal clock signal in phase synchronization with said external clock signal, said programmable divider setting a relationship between an external clock frequency and an internal clock frequency dependent upon said divide number.

29. The microprocessor of claim 23, further comprising:
a plurality of execution units, each execution unit independently capable of executing an instruction;
wherein said instruction rate control means includes a scheduler connected to said plurality of execution units, said scheduler dispatching instructions to said plurality of execution units at a rate corresponding to said rate of instruction operation indicator.

30. The microprocessor of claim 29, wherein:
said scheduler
dispatches instructions to each of said plurality of execution units for a first highest selected rate,
dispatches instructions to a number of execution units less than all of said plurality of execution units for a second selected rate lower than said first selected rate,
dispatches an instruction to only one of said plurality of execution units for a third selected rate lower than said second selected rate, and
dispatches an instruction to only one of said plurality of execution units in only one of a plurality of instruction cycles for a fourth selected rate lower than said third selected rate.

31. The microprocessor of claim 23, further comprising:
an interrupt return instruction detector receiving instructions executed by the microprocessor, said interrupt return instruction detector generating an output signal upon each detection of an instruction returning from an interrupt; and
a rate number push/pop stack memory having a push input connected to said interrupt interpreter, a pop input connected to said interrupt return detector, a data input connected to said rate table memory, a data output connected to said instruction rate control means and a plurality of first-in-last-out data entries, said rate number push/pop stack memory
pushing said rate of instruction operation indicator onto a first stack entry whenever said interrupt interpreter signals the receiving of an interrupt,
popping said first stack entry whenever said interrupt return instruction decoder signals returning from an interrupt, and
supplying said first stack entry to said instruction rate control means.

32. The microprocessor of claim 31, wherein:

said rate stack wherein a bottom entry stores a rate of instruction operation indicator having the greater rate of instruction operation of the prior bottom entry or a next to bottom entry upon a push of said rate stack and copies said prior bottom entry to the next to bottom entry upon a pop of said rate stack.

33. The microprocessor of claim 31, wherein:

said rate stack wherein a bottom entry returns a rate of instruction operation indicator corresponding to a maximum rate of instruction operation upon a pop of said rate stack when said bottom entry is empty.

34. The microprocessor of claim 31, further comprising:

a system management interrupt input receiving a system management interrupt;

a system management mode rate memory storing a rate number;

a multiplexer having a first input receiving said interrupt number of said interrupt interpreter, a second input receiving said rate number of said system management mode rate memory, a control input connected to said system management interrupt input and an output outputting said interrupt number at said first input if said system management interrupt it not active and outputting said rate number at said second input if said system management interrupt is active;

a first AND gate having a first input connected to said interrupt interpreter, a second input connected to said system management interrupt input and an output connected to said push input of said rate number push/pop stack memory;

an invertor having an input connected to said system management interrupt input and an output; and a second AND gate having a first input connected to said interrupt return instruction detector, a second input connected to said output of said invertor and an output connected to said pop input of said rate number push/pop stack memory.

* * * * *